United States Patent Office 2,880,788
Patented Apr. 7, 1959

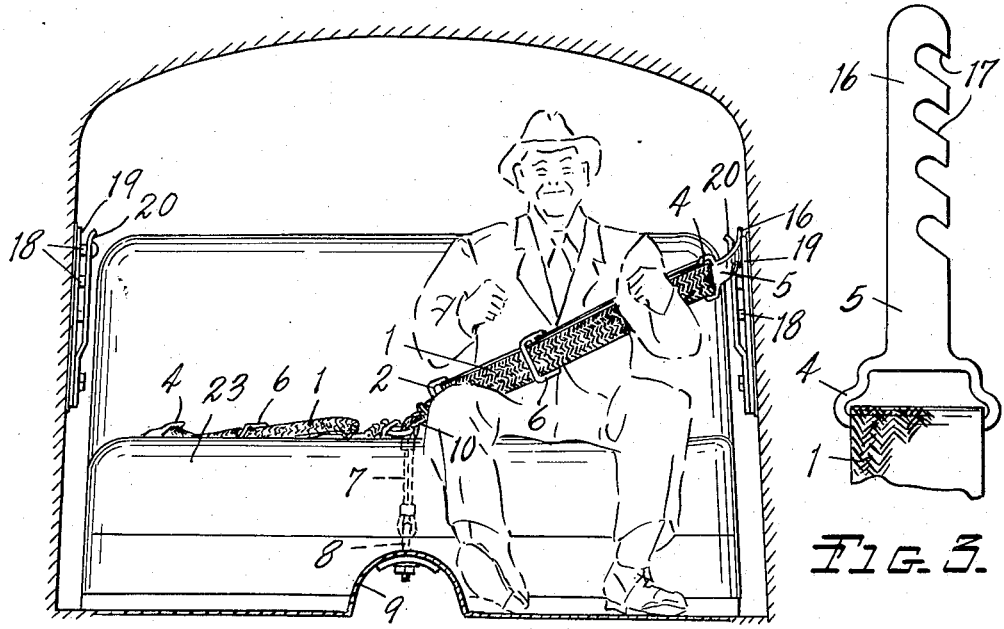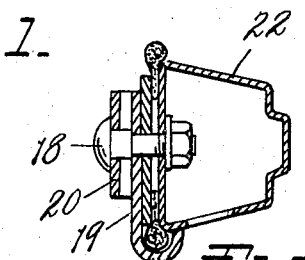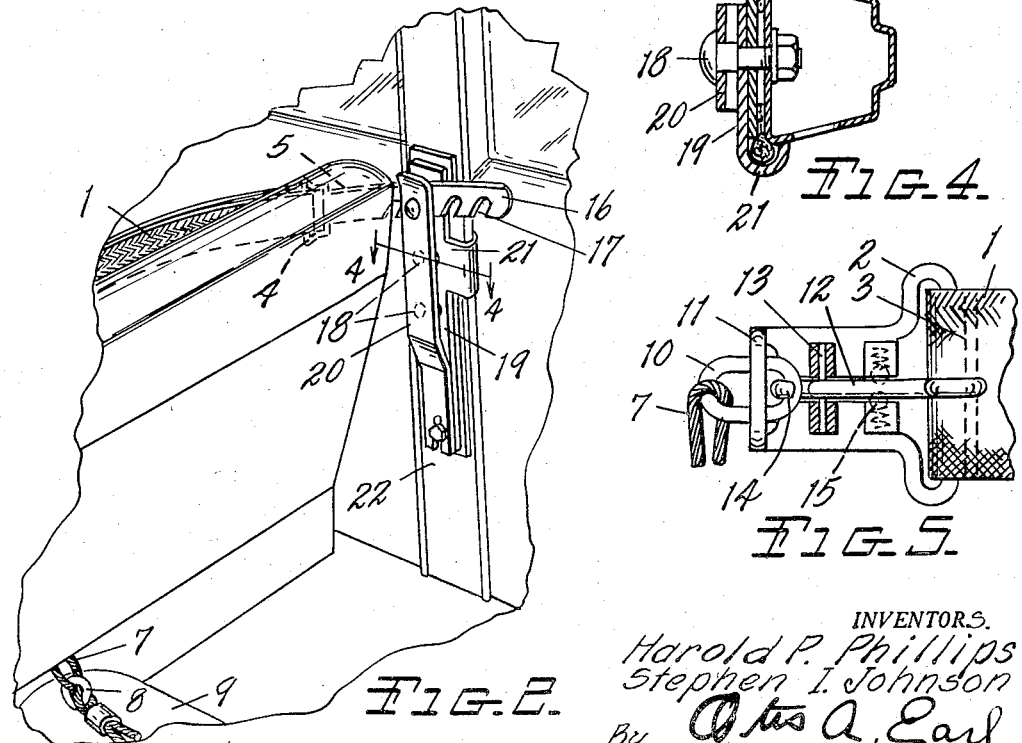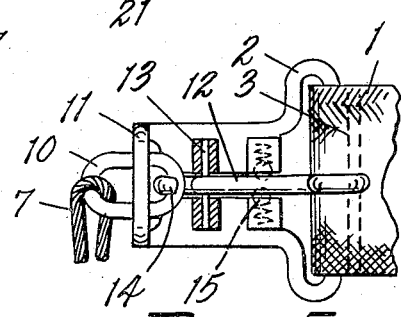
INVENTORS.
Harold P. Phillips
Stephen I. Johnson
By Otis A. Earl
Attorney.

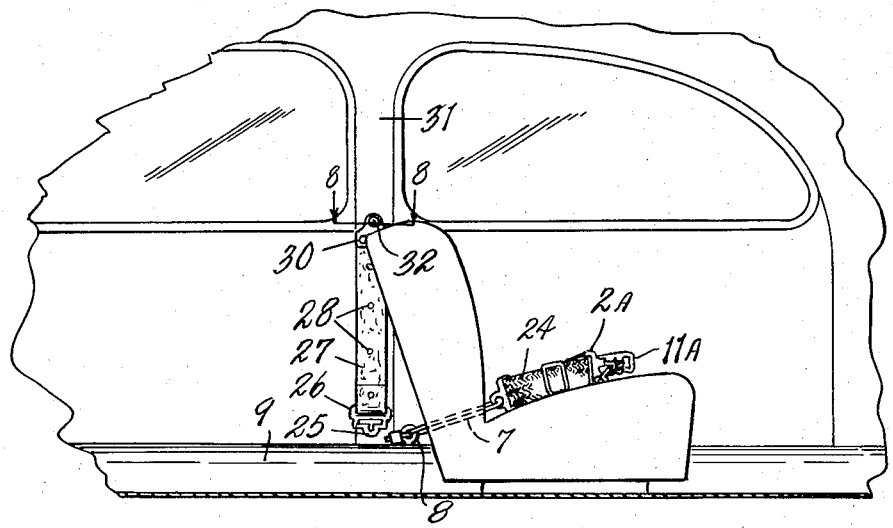
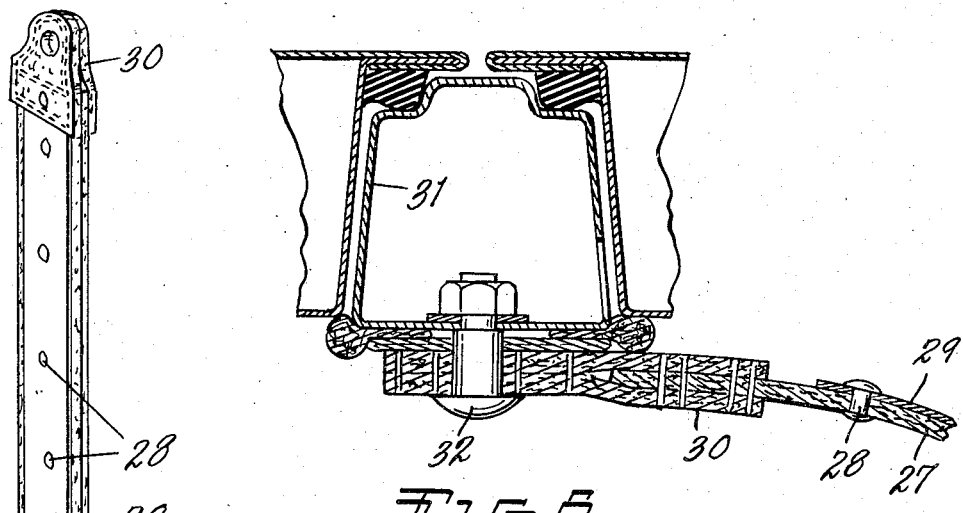
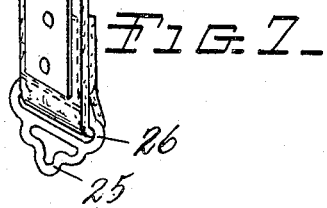

2,880,788

SAFETY BELT FOR AUTOMOTIVE VEHICLES

Harold P. Phillips and Stephen I. Johnson, Hastings, Mich., assignors to Hastings Manufacturing Company, Hastings, Mich.

Application May 2, 1955, Serial No. 505,294

5 Claims. (Cl. 155—189)

This invention relates to improvements in safety belt for automotive vehicles. The principal objects of this invention are:

First, to provide a safety belt for the occupants of automobiles which belt is easily connected to the vehicle and adjusted to the wearer and which is therefore more likely to be used than a belt which is inconvenient to attach.

Second, to provide a safety belt that extends diagonally across the body of the wearer to more effectively hold the wearer in place in the vehicle.

Third, to provide a safety belt that is easily adjusted to accommodate adjustments in the position of the seat of an automobile.

Fourth, to provide a safety belt that can be permanently connected to the outer frame or side wall of a vehicle without becoming entangled in the doorway of the vehicle.

Other objects and advantages of the invention will be apparent from a consideration of the following description and claims. The drawings of which there are two sheets illustrate two highly practical forms of the safety belt.

Fig. 1 is a conventional transverse cross sectional view through an automobile body illustrating in elevation the attachment of a first form of the safety belt to the body in operative relation to an occupant of the vehicle.

Fig. 2 is a fragmentary perspective view of the anchor connection at the outer end of the belt.

Fig. 3 is a fragmentary elevational view of the outer end of the belt.

Fig. 4 is a fragmentary horizontal cross sectional view taken along the plane of the line 4—4 in Fig. 3.

Fig. 5 is a fragmentary elevational view of a quick release coupling at the inner end of the safety belt.

Fig. 6 is a fragmentary longitudinal cross sectional view through a vehicle illustrating a modified form of the safety belt.

Fig. 7 is a perspective view of the outer section of the modified belt.

Fig. 8 is a fragmentary horizontal cross sectional view taken along the plane of the line 8—8 in Fig. 6 and illustrating the outer end of the belt in operative position.

It is a fact long recognized by safety engineers that a great many deaths and injuries resulting from automobile accidents could be avoided if the occupants of automobiles would wear safety belts to hold them in relatively safe position within the vehicle. It is a further recognized fact that the general public resistance to the use of safety belts is in part due to the inconvenience of attaching and detaching the belt and of moving the belt out of the way while entering or leaving the vehicle. The present invention reduces to a minimum the inconvenience caused by the presence of the idle belt and by attaching and detaching the belt for use.

The first form of the belt illustrated in Figs. 1 to 5 consists of a webbed body belt 1 having its inner end looped through an inner coupling clasp 2 and permanently secured thereto as by stitching 3 (see Fig. 5). The outer end of the belt 1 is looped through the eye 4 of a detachable clasp 5 and returned to a length adjusting buckle 6 mounted on the midportion of the belt and by means of which the effective length of the belt can be adjusted.

The clasp 2 at the inner end of the belt has a quick releasable connection to an anchor cable 7 that extends downwardly through the back of the seat and is permanently and fixedly anchored to an eye bolt 8 mounted on a rigidly fixed portion of the vehicle body such as the drive shaft tunnel 9. The quick releasable connection may consist, as illustrated, of a chain link 10 on the anchor cable that is insertable through a slot in the flange 11 on the end of the clasp 2. A latch bar 12 is pivotally supported on the clasp on the pivot pin 13 and provided with a hook at 14 that is engageable through the upper end of the chain link to prevent wtihdrawal of the link from the clasp. The upper or outer end of the latch bar 12 is normally held in parallel lapped relation to the body of the clasp 2 by spring pressed ball detents 15 in which position the hook 14 retains the connection to the link 10. Pulling outwardly or forwardly on the latch bar disengages the hook 14 and permits the clasp and belt to be disengaged from the link 10 and the anchor cable.

The upper or outer clasp 5 has a curved metal tongue 16 having a plurality of hook forming notches 17 therein. The notches 17 are selectively engageable over a plurality of bolts 18 extending between an outer mounting plate and an inner retaining bracket 20. The mounting plate 19 desirably has a rearwardly extending hook 21 hooked around an edge of the door pillar 22 of the vehicle. In any case the mounting plate 19 is secured to the door pillar or other fixed portion of the body frame by the bolts 18. As best appears in Fig. 4 the bolts 18 are shouldered to clamp the mounting plate to the vehicle body and leave a slot between the mounting plate and the retaining bracket for selective reception of the tongue on the clasp.

It is pointed out that the upper end of the anchor 7 and the inner clasp 2 are mounted at about the level of the car seat 23 while the bracket 19 and the bolts 18 are mounted at a substantially higher level on the side of the body. The belt 1 therefore extends diagonally upwardly and outwardly across the body of the wearer to prevent the wearer from being thrown forward by the impact of a collision. The adjustable buckle 6 and the selective engagement between the hooks 17 and the several bolts 18 permit easy adjustment of the belt for comfort of different occupants in different adjusted positions of the seat 23. At the same time the outer end of the belt is easily connected to or disconnected from the bracket 19 for easy exit and entrance from and to the vehicle. A duplicate belt and mounting bracket are provided for the passenger at the other side of the vehicle.

The modified form of belt shown in Figs. 6 and 8 provides a divided belt so that there is not so much of the belt to obstruct the surface of the seat as the occupants enter the vehicle. The modified belt consists of an innerbelt section 24 that is permanently attached to the anchor cable 7 and provided on its free end with a clasp 2A similar to the clasp forming the quick release connection of the first form of the belt. The end flange 11A of the clasp 2A is adapted to receive and be connected to the eye 25 on the end of a clasp 26 secured to the outer belt section 27. The outer belt section has secured to its outer face as by means of the rivets 28 a flat metal spring strip 29 that has sufficient rigidity to hold the belt 27 straight when no load is applied to the belt but it permits the belt to bend freely around the body of the wearer. The outer end of the belt section 27 is permanently secured in the yoke of an anchor clasp 30 and the clasp is fixedly and pivotally anchored to the door post or side frame 31 of the vehicle by a pivot bolt 32.

When the modified form of the belt is disconnected by releasing the quick release or other releasable connection the relatively short inner belt section may lie in unobstructing relation in the center of the seat while the spring strip 29 naturally straightens the outer belt section 27 until the outer belt section lies along the side of the door of the vehicle. The outer belt section then falls by gravity about the pivot pin 32 to assume the unobstructing position along the side of the door column as illustrated. Note that the outer belt section will not become entangled in the doorway to interfere with closing of the door and will not obstruct free entrance into the vehicle. The center anchor 7 is lower than the outer anchor pin 32 so that the modified belt extends diagonally across the wearer's body as with the first form of the belt. Both forms of the belt are easily attached and detached and offer a minimum of inconvenience to the wearer thus overcoming to a great extent the natural resistance of motorists to the use of a safety belt.

Two examples of the safety belt have been illustrated and described so that others may use various combinations of the features of the belts as may be desired. The examples illustrated are not intended to define the limits of the invention which is set forth in the claims.

Having thus described the invention, what is claimed as new and is desired to be secured by Letters Patent is:

1. In an automotive vehicle, a relatively fixed inner anchor located adjacent the back edge of the vehicle seat inwardly from the end thereof, a plurality of anchor pins disposed in vertically spaced relation along a side body member above the level of the seat and projecting inwardly of the vehicle, retaining means at the inner ends of said pins, and a body belt having a connection to said inner anchor and having a clasp with a notched tongue at its outer end selectively engageable with said anchor pins.

2. In an automative vehicle, a relatively fixed inner anchor located adjacent the back edge of the vehicle seat inwardly from the end thereof, an anchor pin disposed on a side body member of the vehicle above the level of the seat and projecting inwardly of the vehicle, a retaining means at the inner end of said pin, and a body belt having a connection to said inner anchor and having a clasp with a notched tongue at its outer end selectively engageable with said anchor pin.

3. In the automotive vehicle the combination of an inner anchor disposed adjacent the rear edge of the seat of the vehicle and connected to a fixed part of the vehicle, an inner belt section secured to said anchor inwardly from the end of the seat, an outer anchor pin secured to a side frame member of the vehicle substantially above the level of said first anchor, an outer belt section pivotally connected to said outer anchor to hang freely along the inside of the vehicle, a springable plate secured to one side of said outer belt section to bias the same to straight extended position, and clasp means forming a quick disengageable connection between the free ends of said belt sections.

4. In combination with a vehicle comprising a body, a seat provided with a back, a door at the end of the seat, the body including an upright member at the end of the seat back and spaced therefrom and defining the rear edge of the door opening, of a body belt connected at its inner end to the vehicle body at a point at the inner side of an occupant of the seat and adjacent the bottom of the back, said belt having an attaching member at its outer end, said upright body member being provided with a keeper with which said belt attaching member may be engaged to support the belt with its inner end portion above but adjacent to the inner leg of the seated occupant with the belt extending diagonally upwardly and outwardly across the body of the seated occupant and under and closely adjacent to the seated occupant's outer arm.

5. In combination with an automotive vehicle including a body and seat, an inner anchor mounted on the body below and at the inner side of the seating area of a seat and substantially spaced rearwardly relative to the front edge of the seat, an outer anchor secured to the vehicle body at the outer side of said seating area of the seat and substantially above the level of the said inner anchor, and a belt connected between said inner and outer anchors and supported thereby in an inwardly inclined diagonal relation to and across the body of an occupant of the seat positioned between the anchors, said belt having a releasable connection permitting it to be passed across the front of the body of an occupant of the seat.

References Cited in the file of this patent

UNITED STATES PATENTS

| | | |
|---|---|---|
| 1,527,878 | Kolber | Feb. 24, 1925 |
| 2,071,903 | Shively | Feb. 23, 1937 |
| 2,365,625 | Carlisle | Dec. 19, 1944 |
| 2,665,143 | Rasmussen | Jan. 5, 1954 |
| 2,670,967 | Kean | Mar. 2, 1954 |
| 2,705,044 | Nolen | Mar. 29, 1955 |
| 2,710,649 | Griswold | June 14, 1955 |
| 2,716,561 | Beran | Aug. 30, 1955 |

FOREIGN PATENTS

| | | |
|---|---|---|
| 311,944 | Italy | Oct. 16, 1933 |